May 14, 1963 W. J. CRAVEN 3,089,353
METHOD FOR MAKING A ROUTER BIT OR THE LIKE
Filed July 25, 1960
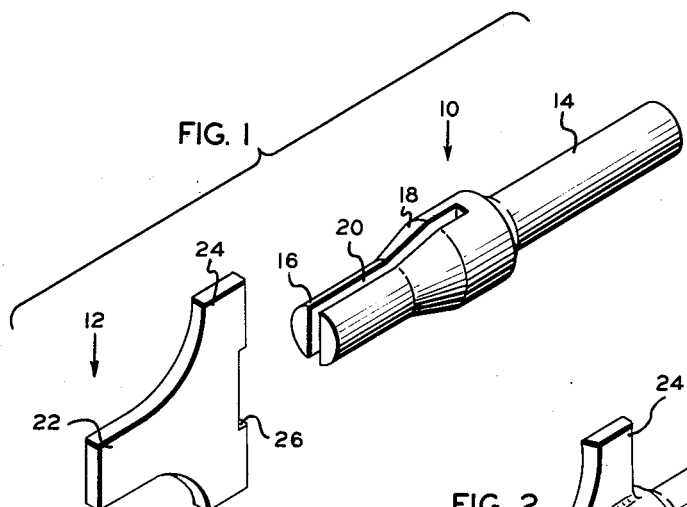
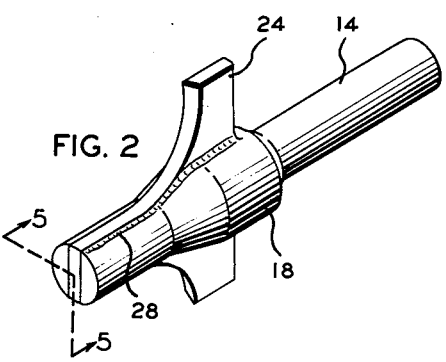
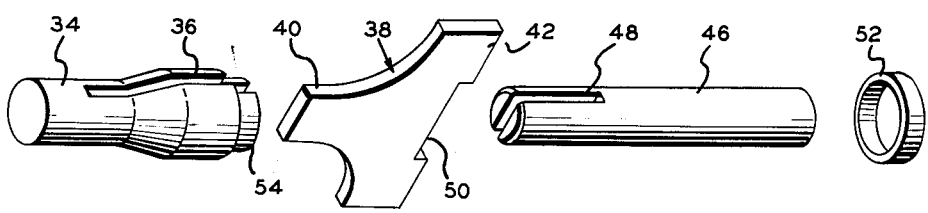
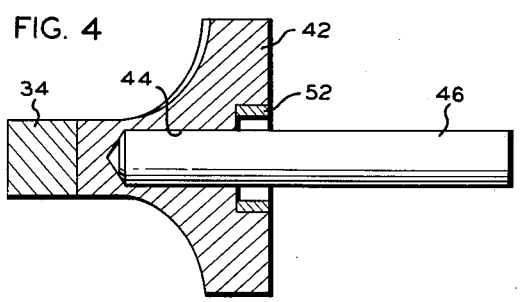
*INVENTOR.*
WILBUR J. CRAVEN
BY
Teller & McCormick
Attorneys.

United States Patent Office 3,089,353
Patented May 14, 1963

3,089,353
METHOD FOR MAKING A ROUTER BIT
OR THE LIKE
Wilbur J. Craven, East Hartford, Conn., assignor to The Capewell Manufacturing Company, Hartford, Conn., a corporation of Connecticut
Filed July 25, 1960, Ser. No. 45,059
4 Claims. (Cl. 76—108)

This invention relates to cutting tools and methods for making the same and, more particularly, to a method for making a cutting tool such as a router bit which comprises a cutting blade and a connected body portion.

Heretofore a number of different methods have been employed in the manufacture of cutting tools of the type mentioned, but certain disadvantages have been encountered in the practice of each of these methods. In accordance with one known method, the cutting blade and the body portion of the tool are formed integrally in a drop-forging process and only nominal machining of the tool is thereafter required to provide a desired shape and to provide cutting edges on the blade. This method has the advantage of low cost, but metals which are suitable for drop-forging do not provide good cutting edges. Thus, cutting tool performance is sacrificed for cost savings in manufacture.

Another known method involves machining of the complete cutting tool from high speed steel bar stock. This method provides for a high quality tool with good performance characteristics but is very costly.

Still another method practiced heretofore involves the separate forming of the cutting blade and the body portion of the tool. The two tool parts are then assembled and joined together by a relatively low temperature soldering process. Cutting tools made in accordance with this method may comprise a high speed steel cutting blade and a body portion of low carbon or shank steel and may therefore be relatively inexpensive and characterized by blade cutting edges of good quality. However, the low temperature soldering process employed to join the cutting blade with the body portion of the tool may lead to considerable difficulty. Ordinarily, the cutting blade must be hardened before the parts are assembled and soldered and the heat applied during the soldering process, while raising the tool temperature to only a relatively low level, may have a substantial softening effect on the cutting blade. Moreover, the bond obtained between the cutting blade and the body portion of the tool is of relatively poor quality initially and heat induced by friction during a cutting operation tends to melt the solder and further weaken the bond with the result that considerable breakage is encountered at the joint between the blade and the body portion of the tool.

In order to avoid joint breakage, some cutting tools made in accordance with the last above-mentioned method are provided with strengthening rings about their pilot sections. These strengthening rings frictionally engage the wood being cut by the bit and appreciably reduce the power available for cutting. Further, the rings, being of larger diameter than the pilot section, produce friction induced heat at a higher level than the pilot sections and there is a greater tendency for the solder to melt and weaken the joint.

It is the general object of the present invention to provide a method for making cutting tools of the type mentioned whereby the finished cutting tool exhibits a high degree of structural integrity throughout, comprises a high speed steel cutting blade having a high quality cutting edge and a body portion of relatively inexpensive shank steel, and may be produced at a desirably low cost.

A more specific object of the invention is to provide a method for making a cutting tool of the type mentioned wherein a relatively high temperature alloying material is used to join the cutting blade and the body portion of the tool, and wherein the operations of joining the blade to the body portion and hardening the blade may be performed concurrently.

The drawing show two different router bit constructions and the method of the present invention may be used to particular advantage in the manufacture of the router bit constructions shown, but it will be understood that the method may be practiced to advantage in making various other cutting tools, and that the drawing and the description which follows are not to be construed as defining or limiting the scope of the invention, the claims forming a part of this specification being relied upon for that purpose.

Of the drawing:

FIG. 1 is an exploded perspective view showing the cutting blade and body portion of a first router bit construction which may be produced with the method of the present invention;

FIG. 2 is a perspective view showing the router bit of FIG. 1 in its assembled and finished form after practice of the method of the invention;

FIG. 3 is an exploded perspective view showing a router bit comprising a three-part body portion and a cutting blade; and FIG. 4 is a longitudinal section through the router bit of FIG. 3 after the parts have been assembled and joined in accordance with the method of the invention.

Referring particularly to FIG. 1, it will be observed that the router bit shown therein comprises a body portion indicated generally at 10 and a cutting blade blank indicated generally at 12. The body portion 10 comprises a generally cylindrical shank section 14, a generally cylindrical pilot section 16, and a generally cylindrical but radially enlarged connecting portion 18. A diametrical slot 20 extends axially inwardly from the end of the pilot section 16 and partially through the connecting section 18. The thickness of this slot is somewhat critical as will be explained more fully hereinafter.

In accordance with the method of the present invention, the body portion of the tool to be manufactured is formed of one of the steels in the class of steels commonly known as "shank steels." The body portion 10 of the router bit shown in FIG. 1 is formed of a particular shank steel which may be identified by its American Iron and Steel Institute Number AISI–5150. Obviously, the body portion 10 of the router bit may be formed by various machining operations, but it is well suited to forming on a screw machine. This latter method of forming is preferred due to the relatively low cost and high quality characteristics of screw machine products.

The cutting blade blank 12 shown in FIG. 1 is generally T-shaped and has a body 22 and a crossarm 24 integral with the body. A notch 26 is formed in the crossarm 24 and is adapted to receive a portion of the connecting section 18 adjacent the inner end of the slot 20 when the blade blank is entered axially in said slot in the body portion 10 of the router bit. In FIG. 2 the blade blank 12 is shown so entered in the slot 20 and it will be seen that the free ends of the crossarm 24 of the blade blank project radially outwardly on opposite sides of the connecting section 18 of the body portion 10. Preferably, the width of the body 22 of the blade blank is such that the edge portions of said body project slightly radially outwardly on opposite sides of the pilot section 16 when the blade blank is entered in the slot 20. As in the case of the slot 20, the thickness of the blade blank 12 is somewhat critical and should be slightly less than the thickness of the said slot as will be seen.

In further accord with the method of the present invention, the blade blank of the cutting tool to be manufactured by practicing the method is formed from one of the steels in the class of steels commonly known as "high speed steels" or "high speed tool steels." The blade blank 12 of the router bit shown in FIGS. 1 and 2 is formed of a molybdenum high speed steel which may be identified as M2 High Speed Steel. There are obviously a number of different ways in which the blade blank 12 may be formed, but blanking is preferred due to its low cost.

In practicing the method of the present invention, a body portion of a cutting tool is formed of shank steel and a blade blank is formed of high speed steel as indicated. In the next step of the method, the cutting tool body portion and blade blank are assembled by entering the blade blank in the slot in the said body portion. In accordance with the presently preferred practice, the two parts of the cutting tool are then temporarily joined together as by spot welding, but this step may of course be eliminated if the blade blank will remain in place in the slot without such temporary connection.

The next step in the method of the present invention involves the selection and application of an alloying material to the joint between the blade blank and the body portion of the tool. In accordance with the invention, an alloying material is judiciously selected to provide for hardening of the tool and joining of its parts in a single operation. That is, an alloying material having a relatively high melting temperature approximately equal to the hardening temperature of the blade blank is selected. This permits the operation of joining the tool parts and hardening of the same to be carried out concurrently by appropriate heating of the assembled cutting tool.

More specifically, the method of the present invention involves the provision of a cutting blade blank having a hardening temperature in the range of 2150° F. to 2250° F. and the selection of an alloying material having a melting temperature in the same range. In accordance with the presently preferred practice, the cutting blade of the tool is slightly underhardened and the steel for the blade is selected to have a hardening temperature in the range of 2210° F. to 2250° F. The assembled tool is then heated to a temperature slightly below this temperature, but sufficiently to melt the alloying material and the desired hardening of the blade is accomplished concurrently with joining of the blade to the body portion of the tool.

As mentioned above, the steel used in forming the blade blank 12 is M2 high speed steel and this steel has a hardening temperature of approximately 2230° F. There are a number of alloying materials which have melting temperatures in the range of 2150° F. to 2250° F. and which may be used in practicing the method of the present invention. However, the alloying material which is preferably used with a cutting blade of M2 high speed steel is a nickel chromium boron alloying powder which is available commercially under the name "Rexweld 64 Brazing Powder." This alloying material has a melting temperature of 2150° F. and while it is referred to as "brazing powder," the process of joining metals together with the powder might more properly be referred to as a "welding process." The principal reasons for the preference for this alloying material over other alloying materials having melting temperatures in the desired range of temperatures are its high strength characteristics at both high and low temperatures. With the used of this alloying material, a cutting tool is provided which is characterized by a high quality joint between the body portion and cutting blade and a high degree of structural integrity throughout. The approximate composition of "Rexweld 64 Brazing Powder" is as follows.

| Ingredient: | Percent |
| --- | --- |
| C | 1.0 |
| Si | 4.0 |
| Cr | 15.0 |
| B | 3.5 |
| Fe | 4.0 |
| Ni | 72.5 |

When "Rexweld 64 Brazing Powder" is used, the step of applying the alloying material along the joint between the blade blank and the body portion of the tool is preferably preceded by a step wherein the alloying powder is mixed with a thinned resin. In this manner a pastelike material which may be conveniently applied to the joint is provided. Preferably an acrylic resin is used for mixing with the "Rexweld 64 Brazing Powder" and the resin is thinned with acetone or ethylene dichloride before mixing with the powder. Approximately one part of resin to 20 parts of thinner should be mixed to provide the thinned resin which is to be mixed with the alloying powder.

As mentioned above, the thickness of the slot 20 in the body portion 10 of the router bit shown in FIGS. 1 and 2 is slightly greater than the thickness of the cutting blade blank 12. When "Rexweld 64 Brazing Powder" is used as an alloying material, the best results are obtained when provision is made for clearances between the blade blank and the slot walls in the range of 2- to 5-thousandths of an inch. When other alloying materials are used, clearances providing optimum results may of course vary.

After the alloying material is applied along the joint between the blade blank and the body portion of the assembled tool as indicated at 28 in FIG. 2, the tool is heated to melt the alloying material and to join and harden the blade blank and the body portion thereof. When the specific steels mentioned above are used in forming the blade blank and body portion of the tool and when "Rexweld 64 Brazing Powder" is used for bonding, the assembled tool is heated in an atmosphere of substantially pure hydrogen to a temperature in the range of 2150° F. to 2250° F. for at least three minutes. More specifically, and in accordance with the presently preferred practice, the tool is furnace heated in an atmosphere of dissociated ammonia to approximately 2200° F. for a period of three to seven minutes. Obviously, several assembled tools with the alloying material applied to their joints may be heated together in the furnace whereby to reduce manufacturing expense.

As a result of furnace or other heating, the alloying material melts and alloying of the material with the parent metal comprising the M2 high speed steel of the blade and the AISI–5150 steel of the body portion takes place to provide a bond of high strength characteristics. The alloying material 28 flows inwardly into the joint between the blade blank 12 and the body portion 10 and is distributed substantially uniformly throughout the joint. Moreover, substantial alloying of the "Rexweld 64 Brazing Powder" with the M2 steel of the blade blank and with the AISI–5150 shank steel of the body portion 10 occurs.

As stated, heating of the assembled tool also results in hardening of the blade blank and the body portion thereof. Heating to 2200° F. results in the desired slightly underhardened blade blank 12, the hardening temperature of the M2 high speed steel being 2230° F. as mentioned. The hardening temperature of the AISI–5150 of the body portion of the tool is approximately 1560° F. and this tool part is therefore overhardened. Overhardening, however, is not so excessive as to cause grain growth resulting in an undesirably coarse grain structure and the said body portion of the tool is not rendered unsuitable for use with a shank and pilot. The reason for using shank steel in forming the body portion of the tool will now be apparent. Such steel is relatively inexpensive and is yet immune to detrimental effects resulting from the bonding and hardening step of the method of the invention. If, for example, a low carbon steel were used in forming the body portion of the tool, substantial grain growth and coarsening of grain structure would be encountered and the body portion of the tool would be rendered less suitable and possibly useless for its intended purpose.

Following the bonding and hardening step of the method of the present invention, the cutting tool is tempered and this operation may be carried out in a conventional manner. Excellent results are obtained when the router bit of FIGS. 1 and 2, bonded and hardened as described, is tempered at 1000 to 1050° F. for a period of about two hours. This tempering operation may be carried out in a furnace having provision for forced circulation of hot gases.

After completion of the tempering operation, the tool may be machined to provide appropriate cutting edges on the blade blank 12 and to remove the projecting edge portions of the body 22 of said blade blank. A conventional grinding operation may be employed and the heat ordinarily generated by friction during grinding will not be sufficient to have detrimental effects on the bond between the tool parts.

From the foregoing, it will be apparent that the method of the present invention may be practiced to provide a cutting tool, such as the router bits of FIGS. 1 and 2, which is characterized by low cost of manufacture and which exhibits a high degree of structural integrity throughout. The bond obtained between the body portion and the cutting blade of the tool exhibits a high degree of strength and will not suffer detrimental effects as a result of subsequent grinding or other machining operations. A high quality cutting edge may be provided on the high speed steel blade and no strengthening ring or other means is required. The friction induced temperatures encountered during use of the cutting tool will not be sufficiently high to weaken the bond between the two parts of the tool and the tool can therefore be expected to have a desirably long life.

Referring now to FIGS. 3 and 4, it will be observed that a router bit shown therein has a three-part body portion. A first part 34 of the body portion, which may properly be referred to as a pilot section, has a slot 36 therein which extends axially outwardly from its inner end and which is adapted to receive a blade blank 38 having a body 40 and a crossarm 42. An axial bore 44 (FIG. 4) in the part 34 of the body portion receives an inner end of a second or shank part 46 of said body portion. Said inner end portion of the second or shank part 46 is provided with a slot 48 which receives the blade blank 38 when the parts are assembled as shown in FIG. 4. A notch 50 in the crossarm 42 of the blade blank 38 receives a ring 52 constituting the third part of the body portion of the cutting tool. Said ring is adapted to slide over the shank part 46 and over a collar portion 54 at the inner end of the pilot section 34.

In practicing the method of the present invention to make a router bit of the type shown in FIGS. 3 and 4, the parts 34, 46 and 52 of the body portion thereof are formed of shank steel such as AISI–5150. The blade blank 38 is formed of high speed steel such as M2 high speed steel. The parts are then assembled as shown in FIG. 4 and spot welding may be accomplished if desired to hold the parts in position. Thereafter, the alloying material, such as "Rexweld 64 Brazing Powder" mixed with a thinned resin, is applied along all joints. Heating of the tool is then accomplished as described above for the router bit of FIGS. 1 and 2 and the tool parts are joined together and hardened. Thereafter, on completion of appropriate tempering and grinding operations, the bit is completed and ready for use.

The invention claimed is:

1. A method for making a cutting tool having a cutting blade and a body portion and comprising the steps of forming a cutting blade blank of high speed steel having a hardening temperature in the range of 2150° F. to 2250° F., forming a body portion of shank steel and with a slot therein which has a thickness slightly greater than the thickness of the blade blank, assembling the tool by entering the blade blank in the slot in the body portion thereof, providing a nickel chromium boron alloying material having a melting temperature in the range of 2150° F. to 2250° F. and applying the same along the joint between the blade blank and the body portion of the assembled tool, heating the assembled tool in a substantially pure hydrogen atmosphere and to a temperature in the range of 2150° F. to 2250° F. for at least three minutes whereby to melt the alloying material and to join and harden the blade blank and body portion of the tool, tempering the tool, and providing a cutting edge on the blade blank thereof.

2. A method for making a cutting tool having a cutting blade and a body portion and comprising the steps of forming a cutting blade blank of high speed steel having a hardening temperature in the range of 2150° F. to 2250° F., forming a body portion of shank steel and with a slot therein which has a thickness slightly greater than the thickness of the blade blank, assembling the tool by entering the blade blank in the slot in the body portion thereof, providing an alloying material having a melting temperature in the range of 2150° F. to 2250° F. and having approximately the following composition:

| Ingredient: | Percent |
|---|---|
| C | 1.0 |
| Si | 4.0 |
| Cr | 15.0 |
| B | 3.5 |
| Fe | 4.0 |
| Ni | 72.5 | applying said alloying material along the joint between the blade blank and the body portion of the assembled tool, heating the assembled tool in a substantially pure hydrogen atmosphere and to a temperature in the range of 2150° F. to 2250° F. for at least three minutes whereby to melt the alloying material and to join and harden the blade blank and body portion of the tool, tempering the tool, and providing a cutting edge on the blade blank thereof.

3. A method for making a cutting tool having a cutting blade and a body portion and comprising the steps of forming a cutting blade blank of high speed steel having a hardening temperature in the range of 2210° F. to 2250° F., forming a body portion of shank steel and with a slot therein which has a thickness slightly greater than the thickness of the blade blank, assembling the tool by entering the blade blank in the slot in the body portion thereof, providing an alloying powder having a melting temperature in the range of 2150° F. to 2250° F. and having approximately the following composition:

| Ingredient: | Percent |
|---|---|
| C | 1.0 |
| Si | 4.0 |
| Cr | 15.0 |
| B | 3.5 |
| Fe | 4.0 |
| Ni | 72.5 | mixing said alloying powder with a thinned resin and applying the mixture along the joint between the blade blank and the body portion of the assembled tool, furnace heating the assembled tool in an atmosphere of dissociated ammonia to a temperature of approximately 2200° F. for a period of three to seven minutes whereby to melt the alloying material and to joint the blade blank and body portion of the tool and to slightly underharden the said blade blank and overharden said body portion, tempering the tool, and providing a cutting edge on the blade blank thereof.

4. A method for making a cutting tool having a cutting blade and a body portion and comprising the steps of forming a cutting blade blank of high speed steel having a hardening temperature of approximately 2230° F., forming a body portion of shank steel and with a slot therein which has a thickness sufficiently greater than the thickness of the blade blank to provide for clearances between the blade blank and the slot walls from 2 to 5 thousandths of an inch, assembling the tool by entering the blade blank in the slot in the body portion thereof, providing an alloying powder having a melting temperature of approximately 2150° F. and having approximately the following composition:

| Ingredient: | Percent |
|---|---|
| C | 1.0 |
| Si | 4.0 |
| Cr | 15.0 |
| B | 3.5 |
| Fe | 4.0 |
| Ni | 72.5 | mixing said alloying powder with a thinned resin and applying the mixture along the joint between the blade blank and the body portion of the assembled tool, furnace heating the assembled tool in an atmosphere of dissociated ammonia to a temperature of approximately 2200° F. for at least three minutes whereby to melt the alloying material and to join the blade blank and body portion of the tool and to slightly underharden the said blade blank and overharden said body portion, tempering the tool for approximately two hours at a temperature in the range of 1000° F. to 1050° F., and grinding a cutting edge on the blade blank thereof.

References Cited in the file of this patent

UNITED STATES PATENTS

| | | |
|---|---|---|
| 1,339,152 | Arnold | May 4, 1920 |
| 2,693,725 | Cummins | Nov. 9, 1954 |
| 2,714,760 | Boam et al. | Aug. 9, 1955 |
| 2,794,468 | Huxtable | June 4, 1959 |
| 2,934,113 | Hollier | Apr. 29, 1960 |